United States Patent Office 3,288,795
Patented Nov. 29, 1966

3,288,795
1,4-BIS-(DIPHENYLACETYL)PIPERAZINES
Tsutomu Irikura, 5 1-chome, Wakagi-cho, Itabashi-ku;
Kuniyasu Masuzawa, 1–24 Toshima, Kita-ku; and Keigo
Nishino, 5–25 Shimo, Kita-ku, all of Tokyo, Japan
No Drawing. Filed July 29, 1965, Ser. No. 476,230
Claims priority, application Japan, July 31, 1964,
39/43,702
8 Claims. (Cl. 260—268)

This invention relates to 1,4-bis-(substituted or unsubstituted diphenylacetyl)-piperazines and to the preparation thereof. The new piperazine derivatives correspond to the formula

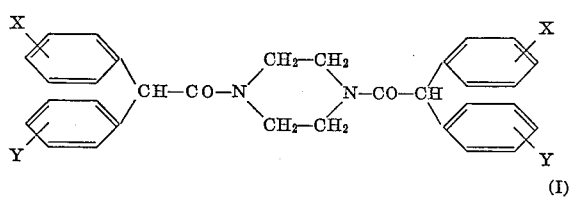

(I)

wherein X and Y independently stand for H, halogen or lower alkyl.

1,4-bis-(substituted or unsubstituted diphenylacetyl)-piperazines of the foregoing formula are novel compounds. They are pharmacologically useful in that they react on the central nervous system; in fact, they exhibit remarkable action as CNS (central nervous system) depressants, as well as analgesic effect and antipyretric effect.

The analgesic effect exhibited by the aforesaid novel compounds of the present invention is more remarkable than that of codeine phosphate, while their antipyretic effect is substantially equal to that of phenacetine and their anti-inflammatory effect is like that of aminopyrine. Nothwithstanding the slight solubility in water of the said new compounds, a very small concentration thereof sufficies to reach activity level. The new compounds are further characterized by very low toxicity, and, most importantly, habituation and tolerance are now observed. This is satisfactorily demonstrated, for example, by the observation that when 20 mg./kg. (milligrams per kilogram) per day of the respective compounds was administered to a mouse successively for 60 days, the same analgesic effect was shown on the last day as on the first day.

The compounds (I) of this invention are considerably more active than the widely-used salicylates, pyrazolones and acetanilides. The only action exerted by the new compounds are the depressant action on the central nervous system, the antipyretic effect, the analgesic effect and the anti-inflammatory effect; no further action which might interfere with normal routine activity is involved.

The new compounds (I) of the invention are crystalline powders, generally slightly soluble in water and in aqueous solutions of acids and bases, but soluble in hot ethanol, trichloroethane, dioxane and benzene.

The said novel compounds (I) are prepared by the reaction of an acid halide with piperazine or piperazine hexahydrate in a suitable organic solvent, in accordance with the following reaction scheme:

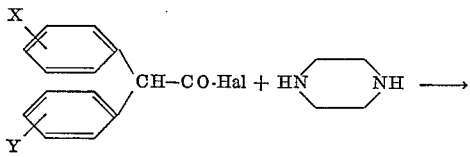

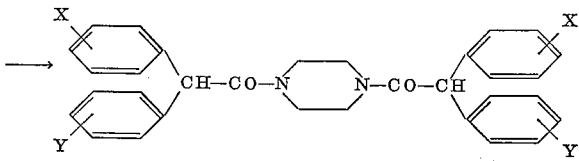

wherein X and Y are as previously defined and Hal is a halogen atom.

An alternative process, in which an ester is employed, is in accordance with the following scheme:

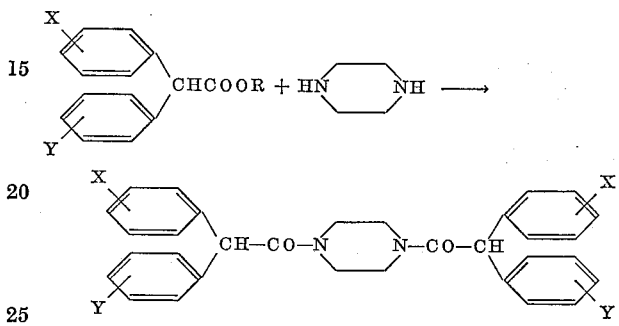

wherein X and Y are as previously defined and R is lower alkyl.

The new compounds (I) are therapeutically useful, either singly or in admixture with any other medicament which enhances the analgesic effect. The new compounds can be used in tablet form, prepared in per se conventional manner with usual tabletting excipients. They can also be used in powder form; or encapsulated in conventional capsules, e.g. of gelatin; or in a finely dispersed suspension, e.g. aqueous suspension. They may be incorporated into suppositories prepared by mixing the compound (I) with fatty carrier material such as cocoa butter which melts at the body temperature, and molding the mixture into suppository form. They can thus be administered orally or per os. Where the active compound (I) is used with a carrier, a minor proportion of the former relative to the latter is employed. Appropriate dosages will vary from about 10 mg./kg. of body weight per day to about 15 mg./kg. of body weight per day.

Following are presently preferred illustrative, but not limitative, examples of this invention:

Example 1

5.6 grams of piperazine hexahydrate is dissolved in 100 milliliters of acetone, while cooling with water. Six grams of diphenylacetyl chloride is added dropwise into the resultant solution. The crystals which form are filtered off and washed successively with aqueous solution of NaOH (5%) and HCl (5%) and with water. Recrystallization from dimethylformamide gives white granular crystals of 1,4-bis-(diphenylacetyl)piperazine, M.P. 280° C. (decomp.). Yield: 73%.

*Analysis.*—Calculated for $C_{32}H_{30}O_2N_2$: C, 80.98; H, 6.37; N, 5.90%. Found: C, 80.90; H, 6.46; N, 6.15%.

Example 2

15 grams of di(p-chlorophenyl)acetyl chloride are added dropwise to a solution of 9.7 grams of piperazine hexahydrate in 100 milliliters of acetone. The crystals which form are filtered off and washed with water. Recrystallization from dimethylformamide and dioxane gives 1,4-bis-[di(p-chlorophenyl)acetyl]piperazine as white crystals, M.P. 260–261° C. Yield: 61.3%.

*Analysis.*—Calculated for $C_{32}H_{26}O_2N_2Cl_4$: C, 62.75; H, 4.28; N, 4.58%. Found: C, 62.78; H, 4.04; N, 4.55%.

Example 3

13.3 grams of (p-chlorophenyl)phenylacetyl chloride are added dropwise to a solution of 9.7 grams of piperazine hexahydrate in 100 milliliters of acetone. The crystals which form are filtered off and washed with water. Recrystallization from dimethylformamide gives 1,4-bis-[(p-chlorophenyl)-phenyl-acetyl]piperazine as white crystals, M.P. 316–317° C. Yield: 57.4%.

Analysis.—Calculated for $C_{32}H_{28}O_2N_2Cl_2$: C, 70.72; H, 5.19; N, 5.16%. Found: C, 71.00; H, 5.15; N, 5.26%.

Example 4

15.6 grams of (p-methylphenyl)phenylacetyl chloride are added dropwise to a solution of 11.7 grams of piperazine hexahydrate in 150 milliliters of acetone. The crystals which form are filtered off and washed with water. Recrystallization from dioxane gives 1,4-bis-[(p-methylphenyl)phenylacetyl]piperazine as white crystals, M.P. 239–251° C. Yield: 59.8%.

Analysis.—Calculated for $C_{34}H_{34}O_2N_2$: C, 81.24; H, 6.82; N, 5.57%. Found: C, 80.64; H, 6.65; N, 5.41%.

Example 5

The analgesic effect of e.g. the compound of the formula

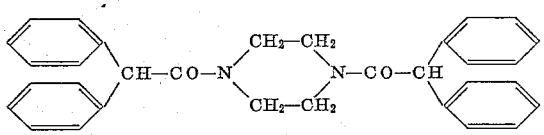

is evaluated from the reaction of a mouse to pressure applied to its tail. The effect, relative to that of codeine phosphate as control, is measured with a group of ten mice, and the efficacy ratio determined by four point assay. The result is shown in the following:

Efficacy ratio [1] _____ 1.103
Confidence limit _____ 0.377–1.141
Level of significance _____ α=0.05

[1] Relative to that of codeine phosphate assumed to be unity.

What is claimed is:
1. 1,4-bis-(diphenylacetyl)piperazine of the formula

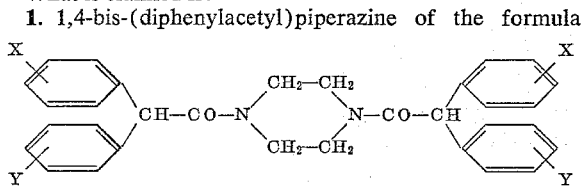

wherein X and Y are selected independently from the group consisting of H, halogen and lower alkyl.

2. 1,4-bis-(diphenylacetyl)piperazine of the formula

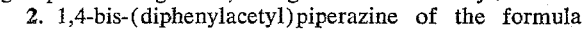

wherein X is halogen.

3. 1,4-bis-(diphenylacetyl)piperazine of the formula

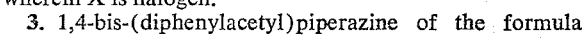

wherein X is lower alkyl.

4. 1,4-bis-[di(halophenyl)acetyl]piperazine of the formula

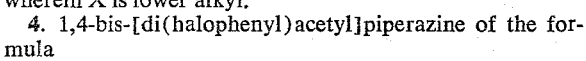

wherein Hal stands for a halogen atom.

5. 1,4-bis-(diphenylacetyl)piperazine.
6. 1,4-bis-[di(p-chlorophenyl)acetyl]piperazine.
7. 1,4-bis-[(p-chlorophenyl)phenylacetyl]piperazine.
8. 1,4-bis-[(p-methylphenyl)phenylacetyl]piperazine.

References Cited by the Examiner

Zaugg et al.: Journal American Chem. Soc., vol. 72, pp. 3004, 3007, 1950.

ALEX MAZEL, *Primary Examiner.*

JAMES W. ADAMS, JR., *Assistant Examiner.*